United States Patent [19]
Tajima

[11] Patent Number: 5,381,444
[45] Date of Patent: Jan. 10, 1995

[54] RADIO ENVIRONMENT MEASURING SYSTEM

[75] Inventor: Masami Tajima, Kawasaki, Japan

[73] Assignee: Fujitsu Limited, Kawasaki, Japan

[21] Appl. No.: 969,460

[22] Filed: Oct. 30, 1992

[30] Foreign Application Priority Data

Oct. 31, 1991 [JP] Japan .................. 3-286213
Jun. 30, 1992 [JP] Japan .................. 4-172993

[51] Int. Cl.⁶ .................. H04L 27/30; G01S 13/46
[52] U.S. Cl. .................. 375/1; 380/34; 342/118; 342/125; 379/58; 379/59; 455/33.1; 455/53.1; 455/54.1; 455/67.1; 455/67.6
[58] Field of Search .................. 455/52.3, 54.1, 54.2, 455/56.1, 65, 67.1, 67.3, 67.4, 67.6, 33.1, 53.1; 375/1, 11-14; 380/38, 34; 342/118, 125; 379/58, 59

[56] References Cited

U.S. PATENT DOCUMENTS

| | | | |
|---|---|---|---|
| 3,315,257 | 4/1967 | Sauberlich | 342/125 |
| 3,714,650 | 1/1973 | Fuller et al. | 342/125 X |
| 3,790,940 | 2/1974 | Becker | 342/125 |
| 4,593,273 | 6/1986 | Narcisse | 342/125 X |
| 4,667,202 | 5/1987 | Kammerlander et al. | 455/54.2 X |
| 4,907,290 | 3/1990 | Crompton | 455/56.1 |
| 5,208,756 | 5/1993 | Song | 455/54.1 X |

FOREIGN PATENT DOCUMENTS

| | | |
|---|---|---|
| 63-501981 | 8/1988 | Japan . |
| 1-223371 | 9/1989 | Japan . |
| 1-292277 | 11/1989 | Japan . |
| 4-15584 | 1/1992 | Japan . |

Primary Examiner—Bernarr E. Gregory
Attorney, Agent, or Firm—Armstrong, Westerman, Hattori, Mcleland & Naughton

[57] ABSTRACT

A radio environment measuring system for measuring a propagation state of radio waves includes: a fixed radio apparatus provided in a base station; a mobile radio apparatus operatively connected to the fixed radio apparatus through the radio waves; the mobile radio apparatus having a repeater unit for receiving a transmission signal from the fixed radio apparatus and sending a returned signal to the fixed radio apparatus; and the fixed radio apparatus having a transmission/reception unit for sending the transmission signal to the mobile radio apparatus and receiving the returned signal from the mobile radio apparatus, and a measuring unit for measuring the propagation state of the radio waves, for example, a propagation distance, direction and reception intensity of the radio waves between the fixed radio apparatus and the mobile radio apparatus based on the transmission signal and the returned signal.

12 Claims, 12 Drawing Sheets

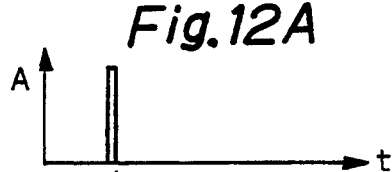
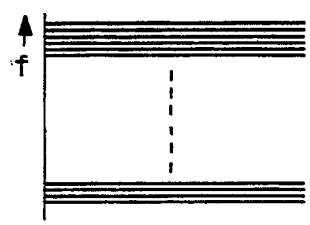
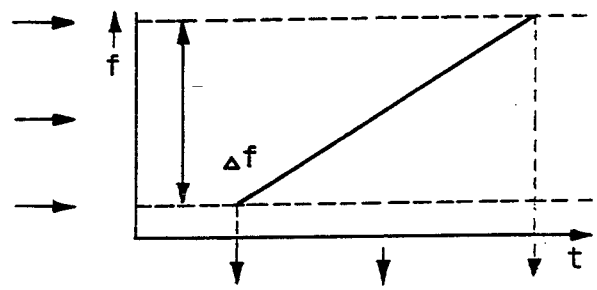
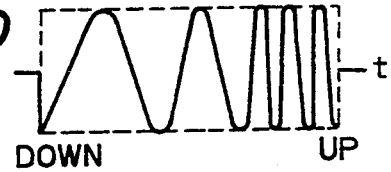
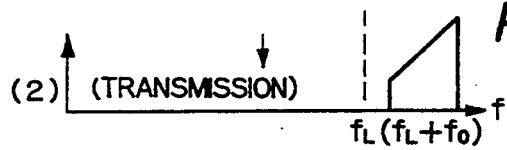
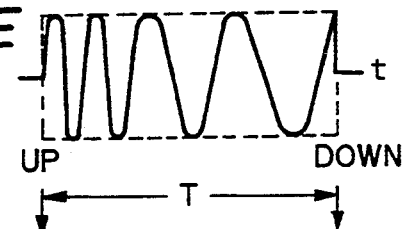
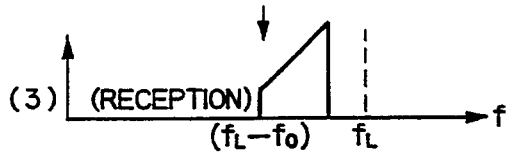
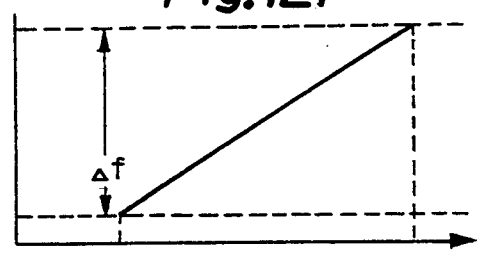
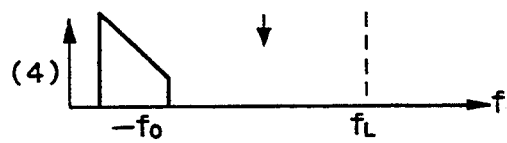
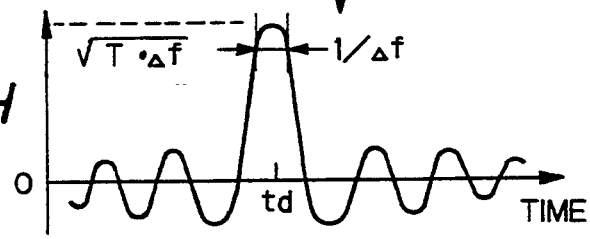

RADIO ENVIRONMENT MEASURING SYSTEM

BACKGROUND OF THE INVENTION

1. Field of the Invention

The present invention relates to a radio environment measuring system, more particularly, it relates to a radio environment measuring system for measuring a propagation state of radio waves, for example, propagation distance, propagation direction, and reception intensity of the radio waves, and improving the characteristics of a propagation path of the radio waves.

2. Description of the Related Art

Recently, various mobile radio communication systems, such as a land mobile radio telephone and a portable radio telephone, have been developed in the field of mobile radio communication systems. Further, as the structure of the system becomes more complex, it is necessary to obtain a propagation state of the radio waves between the radio apparatuses in the environment in which the radio waves are used. In this case, by investigating the relationship between the location of a radio base station including a fixed radio apparatus) and the propagation state of the radio waves within the service zone thereof, it is possible to provide the radio base station at an optimum location.

In various radio waves, for example, a radio wave directly propagated between radio apparatuses, a radio wave reflected from the wall of a building, etc, and other radio waves incoming from an external environment, to know how these radio waves are propagated is the most important element in obtaining an optimum radio environment. Accordingly, it is desired to realize a measuring method to easily and precisely obtain the propagation state of the radio waves.

SUMMARY OF THE INVENTION

The object of the present invention is to provide a radio environment measuring system enabling precise measurement of the propagation state of radio waves, for example, the propagation distance, direction and reception intensity of the radio waves.

In accordance with the present invention, there is provided a radio environment measuring system for measuring the propagation state of radio waves including:

a fixed radio apparatus provided in a base station;

a mobile radio apparatus operatively connected to the fixed radio apparatus through the radio waves;

the mobile radio apparatus having a transmission/-reception unit for receiving a transmission signal from the fixed radio apparatus and sending a return signal to the fixed radio apparatus; and the fixed radio apparatus having a transmission/-reception unit for sending the transmission signal to the mobile radio apparatus and receiving the returned signal from the mobile radio apparatus, and a measuring unit for measuring the propagation state of the radio waves, for example, a propagation distance, direction and reception intensity of the radio waves between the fixed radio apparatus and the mobile radio apparatus based on the transmission signal and the returned signal.

In one preferred embodiment, the transmission/-reception unit of the fixed radio apparatus includes a repeater unit for receiving the returned signal and again sending the returned signal to the mobile radio apparatus, and the transmission/reception unit of the mobile radio apparatus also includes a repeater unit for sending the returned signal to the fixed radio apparatus, and further, the transmission/reception of the transmission and returned signals are performed for predetermined times between the fixed radio apparatus and the mobile radio apparatus.

In another preferred embodiment, the measuring unit measures the propagation state of the radio waves based on the first transmission signal and the returned signal after transmission/reception for predetermined times.

In still another embodiment, the fixed radio apparatus further include a non-directional antenna and a directional antenna.

In still another embodiment, the transmission/reception unit of the fixed radio apparatus further includes a side lobe compression unit for deciding on a reception signal based on a main lobe when the reception level of the directional antenna is larger than that of the non-directional antenna.

In still another embodiment, the transmission/reception unit of the fixed radio apparatus further includes a sweep unit for switching the frequency of the transmission signal and sweeping the frequency, and the measuring unit measures the propagation state of the radio waves based on the change of the phase difference between the transmission signal and the returned signal.

In still another embodiment, the transmission/reception unit of the fixed radio apparatus further includes a transmission unit for sending a transmission signal modulated by codes having relatively large auto-correlation, and the measuring unit measures the propagation state based on the auto-correlation for the demodulated coded which are obtained by the returned signal from the mobile radio apparatus.

In still another embodiment, the transmission/reception unit of the mobile radio apparatus further includes a delay circuit for delaying the returned signal based on the instruction from the fixed radio apparatus.

In still another embodiment, the measuring unit of the fixed radio apparatus further includes a square-composition unit for obtaining the phase difference between the returned signal and the reference carrier having 90 degrees of phase difference, and squaring the phase difference signal to obtain the composition signal.

In still another embodiment, the transmission/reception unit of the fixed radio apparatus further includes a dispersive delay line and a pulse oscillator for generating linear frequency modulated pulses in the transmission unit, and a limit amplifier LIM and a dispersive delay line for demodulating in the reception unit; further, the mobile radio apparatus further includes a frequency converter and the limit amplifier.

In still another embodiment;

the fixed radio apparatus generates a transmission signal similar to a radar radio wave from the pulse oscillator, performs the linear frequency modulation to obtain a spectrum-spread pulse for the time axis by the dispersive delay line, and sends the spectrum-spread pulse to the mobile radio apparatus;

the mobile radio apparatus performs the spectrum inversion based on the frequency-converted reception signal, and sends the returned signal to the fixed radio apparatus;

the fixed radio apparatus performs the frequency conversion to obtain the linear-frequency modulated pulse having the opposite characteristic to the transmission signal, suppresses the modulated pulse based on the function of the pulse compression radar to concentrate the reflection energy spread for the time and frequency, and measures the propagation state of radio waves for every delay time from the start of the transmission of the radio waves from the fixed radio apparatus.

In still another embodiment, each of the limit amplifiers in the fixed and mobile radio apparatuses has the function of suppressing the amplitude of the strong interference wave, and the above amplitude-limited interference waves are spread by the pulse compression function for the time and frequency.

BRIEF DESCRIPTION OF THE DRAWINGS

In the drawings:

FIG. 12A–12H are an explanatory view of a pulse compression radar used in the second embodiment of the present invention,

DESCRIPTION OF THE PREFERRED EMBODIMENTS

Before describing the preferred embodiment of the present invention, a conventional art and its problems are explained in detail below.

Figure 1:
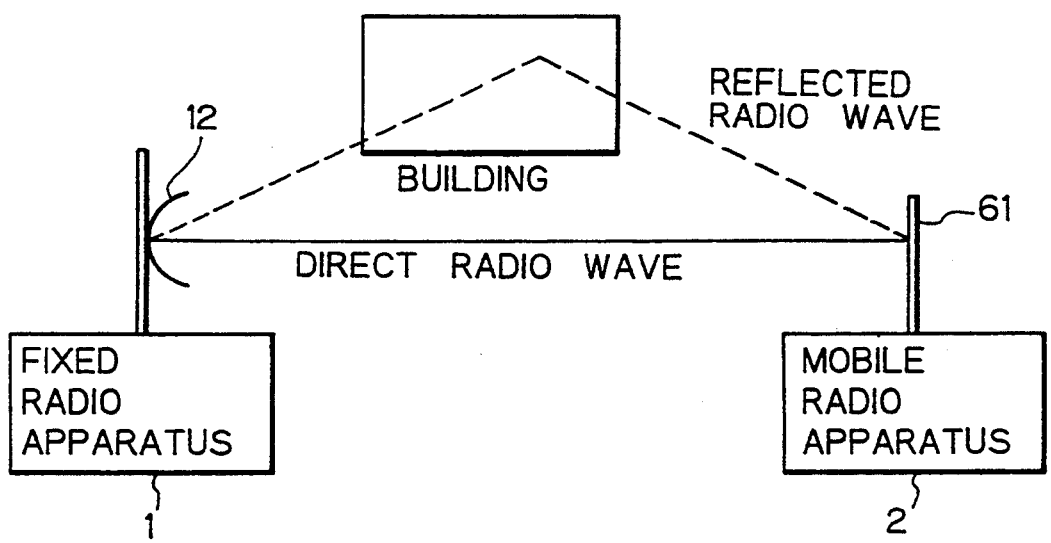
FIG. 1 is an explanatory view of propagation of radio wave between a fixed radio apparatus and a mobile radio apparatus.

FIG. 1 is an explanatory view of propagation of a radio wave between a fixed radio apparatus and a mobile radio apparatus. As shown in FIG. 1, as one path, the radio wave is directly propagated from the fixed radio apparatus 1 to the mobile radio apparatus, and as another path, the radio wave is reflectingly propagated by the wall of a building. In general, the former is called a "direct radio wave", and the latter is called a "reflected radio wave".

Figure 2:
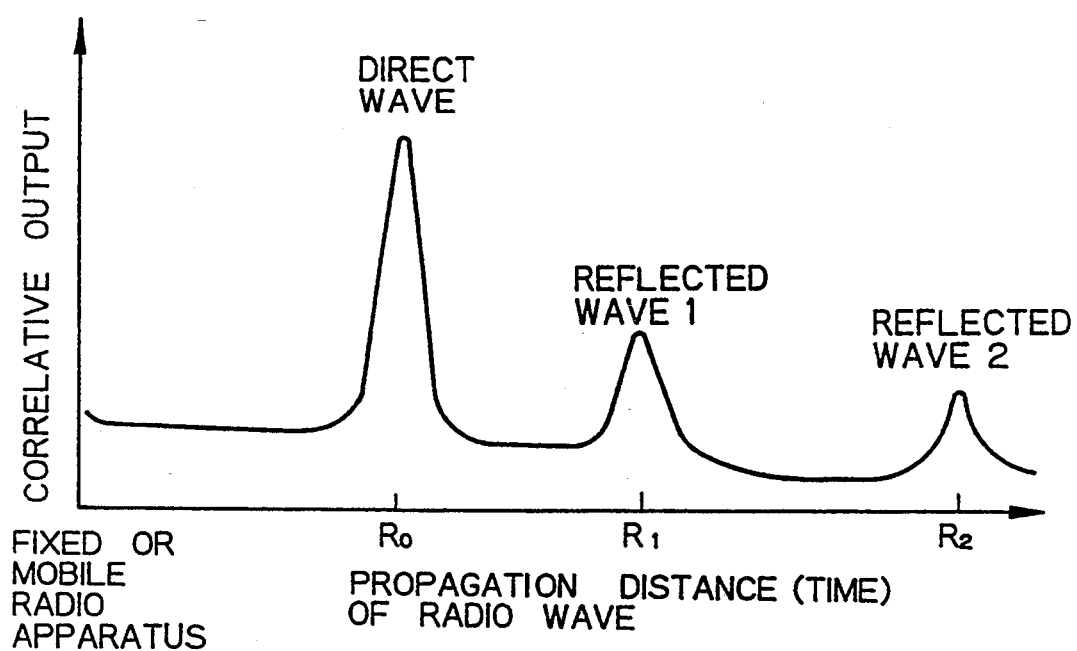
FIG. 2 is an explanatory view of the relationship between the correlative output at a reception side of the radio wave and the propagation distance (propagation time) of the radio wave.

FIG. 2 is an explanatory view of the relationship between the correlative output at a reception side of the radio wave and the propagation distance (propagation time) of the radio wave. In FIG. 2, the correlative output denotes an intensity of the reception signal of the radio wave at the fixed radio apparatus, and the intensity of the reception signal becomes weaker in accordance with the propagation distance of the radio wave. In the drawing, reference letters $R_0$, $R_1$ and $R_2$ denote the propagation distance of the radio wave which correspond to the time elapsed from the radiation of the radio waves. That is, first, the direct radio wave reach the fixed radio apparatus, second, the reflected radio wave reach one, and third, another reflected radio wave reaches to one. Accordingly, it is possible to measure not only the propagation distance (propagation time) of the direct radio wave, but also that of the reflected radio wave in the fixed radio apparatus. This example corresponds to the "A-scope" of a radar system.

In a conventional measuring method of a radio environment, a fixed radio apparatus (provided in the radio base station) radiates radio waves through a non-directional antenna, and a mobile radio apparatus receives the radio waves to measure the propagation state, i.e., the propagation distance and the intensity of the radio waves. In this case, the radio wave measurement is one-way.

Further, in an urban district in which there are many high buildings, since such high buildings constitute reflective bodies against the radio waves, it is very difficult for the mobile radio apparatus to distinguish whether received radio wave is direct or reflected radio wave. Accordingly, it is very difficult to precisely measure the propagation distance/time of the radio wave.

To solve the above problem, the following method is proposed in this field. That is, the fixed radio apparatus sends a carrier wave modulated by PN (pseudo noise) codes having large auto-correlation to the mobile radio apparatus, and the mobile radio apparatus distinguishes whether it receives a direct radio wave or a reflected radio wave based on the maximum autocorrelation. Further, another structure is proposed in which the modulation speed is set to a higher value, for example, 10 MHz so as to distinguish the reflected radio wave. According to this method, it is possible to improve the accuracy of measurement of the distance and the propagation path, and improve the resolution for measurement of the intensity of the radio wave.

However, some problems remain in the conventional method in which the mobile radio apparatus receives a radio wave from the fixed radio apparatus and measures the reception level and direction. One is interference of the radio waves due to multi-path reflections caused by buildings. In this case, it is very difficult to measure the propagation state because of the fluctuation of the radio wave caused by the interference.

Another is a range cell representing the minimum resolution distance. In this case, it is necessary to shorten the range cell and to narrow the pulse width to raise the resolution for the propagation distance. Since this requires a higher modulation speed, the necessary range of the radio wave becomes broader. However, since the usable range of the radio wave is limited, it is impossible to employ means to broaden the necessary range. Accordingly, it is impossible to raise the modulation speed of the carrier so that it is very difficult to improve the resolution for measuring the propagation distance.

Further, since the mobile radio apparatus uses a non-directional antenna to receive the radio wave from the fixed radio apparatus, it is impossible to measure the incoming direction of the radio wave. Further, in the case of the directional antenna, the direction of the side-lobe becomes incorrect for the direction of the main-lobe so that it is impossible to measure the incoming direction of the radio wave.

Figure 3:
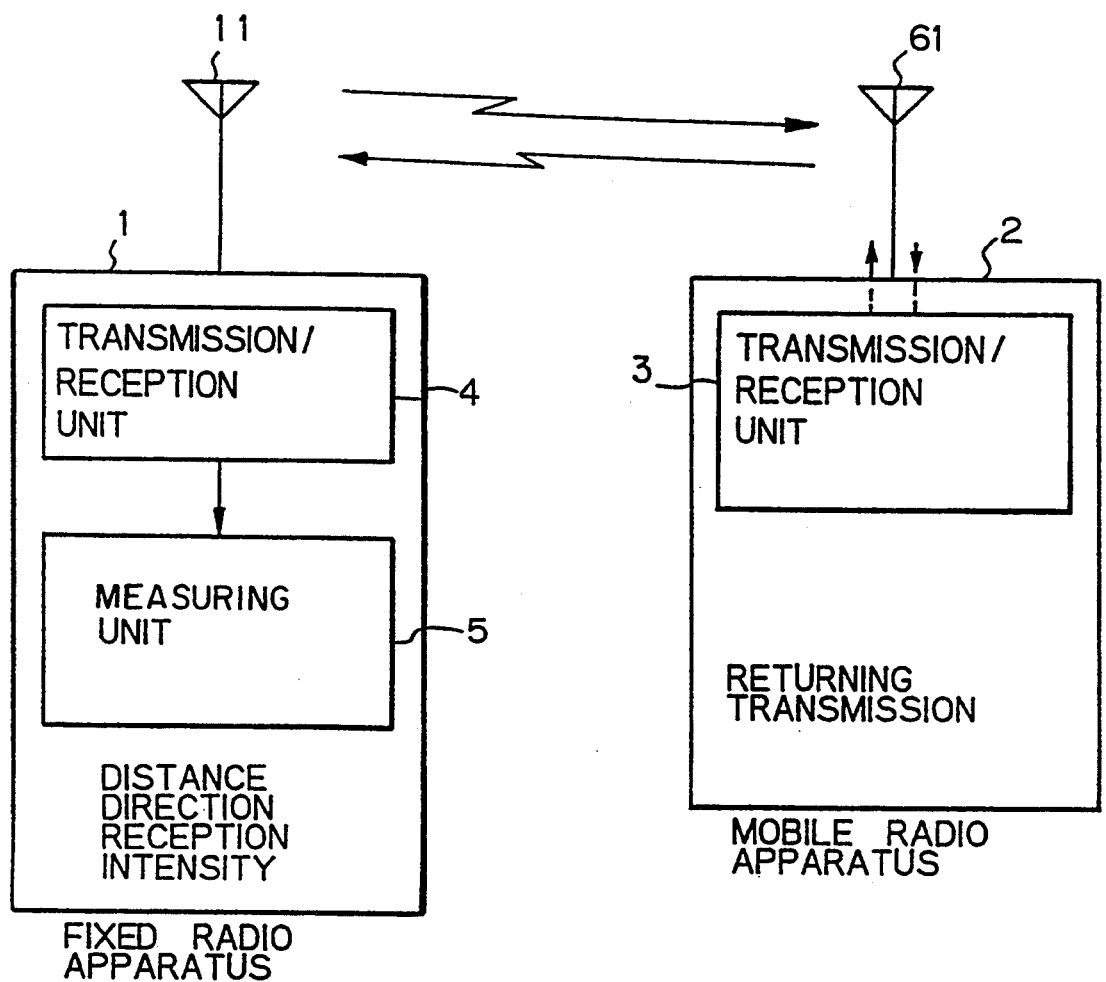
FIG. 3 is a principal structural view of the present invention.

FIG. 3 is a principal structural view of the present invention. As shown in FIG. 3, the radio environment measuring system according to the present invention has the fixed radio apparatus 1 and the mobile radio apparatus 2. The mobile radio apparatus 2 has the transmission/reception unit 3 having repeater means for receiving the signal from the fixed radio apparatus 1 and sending a return signal to the fixed radio apparatus 1. The fixed radio apparatus 1 has the transmission/reception unit 4 and the measuring unit 5 for measuring the propagation distance, the direction and the reception intensity (level) of the radio wave based on the signal returned from the mobile radio apparatus 2.

In the first embodiment of the present invention, the transmission/reception unit 4 of the fixed radio apparatus 1 has the repeater means which receives the returned signal from the mobile radio apparatus 2 and again transmits thereto. The measuring unit 5 has the measuring means which measures the propagation distance, direction and reception level of the radio wave based on the reception signal after transmission/reception for predetermined times, and the first transmission signal.

Further, the fixed radio apparatus 1 has the non-directional antenna and the directional antenna, the transmission/reception unit 4 has the side lobe suppression means which decides the reception signal based on the main lobe when the reception level of the directional antenna is higher than that of the non-directional antenna.

Further, the transmission/reception unit 4 of the fixed radio apparatus has sweep means which sweeps and switches the transmission signal. The measuring unit 5 has the measuring means which measures the propagation distance, distance and the reception intensity based on the change of the phase difference between the returned signal from the mobile radio apparatus and the first transmission signal.

Further, the transmission/reception 4 has the transmission means which transmits the signal modulated by the code having large auto-correlation, and the measuring unit 5 has the measuring means which measures the propagation distance, direction and the reception level based on the auto-correlation of the code demodulated from the signal returned from the mobile radio apparatus 2. The transmission/reception unit 3 has the delay circuit which controls the delay time of the reception signal based on the instruction from the fixed radio apparatus 1. The measuring unit 5 has the square-composition means which squares and composes the phase difference signal obtained from the phase difference between the returned signal from the mobile radio apparatus 2 and the base carriers each having the phase difference of 90 degrees.

The measuring unit 5 measure the propagation distance (or time) both ways (i.e., going and returning). Accordingly, since a double distance is used for the measurement, it is possible to improve the measuring resolution of the propagation distance. Further, since only a propagation wave that passes through the repeater is amplified in the mobile radio apparatus so that gain of the transmission/reception unit 3 is previously obtained, it is possible to easily correct the reception level of the fixed radio apparatus.

Further, the transmission/reception unit 4 has the same repeater (signal-returning means) as the mobile radio apparatus 2 so that it is possible to return transmission/reception for predetermined times between the fixed and mobile apparatuses. Accordingly, after repetition of transmission/reception for several times, since the propagation distance of the direct and reflected radio waves appears to be longer, it is possible to improve the measuring resolution of the distance and to raise the precision of the measurement. This is very effective when the distance between the mobile radio apparatus and the fixed radio apparatus is very small.

The non-directional antenna 11 of the fixed radio apparatus 1 has the same gain for any horizontal direction in 360 degrees. The directional antenna 12 has a larger gain than the non-directional antenna 11 for the direction of the main lobe and has a smaller gain than the non-directional antenna 11 for the direction of the side lobe. Accordingly, the measuring unit 5 compares the reception level of the non-directional antenna with that of the directional antenna so that is possible to perform the reception based on the side lobe suppression and to precisely measure the direction of the mobile radio apparatus 2 based on the main lobe of the directional antenna 12.

Further, the sweep means of the transmission/reception unit 4 sweeps or changes the frequency of the transmission signal. Since the phase difference between the transmission signal and the reception signal in the measuring unit 5 changes in accordance with the slight change of the frequency, it is possible to obtain the propagation distance based on the ratio of the number of radio waves within the propagation distance of the radio wave.

Figure 4:
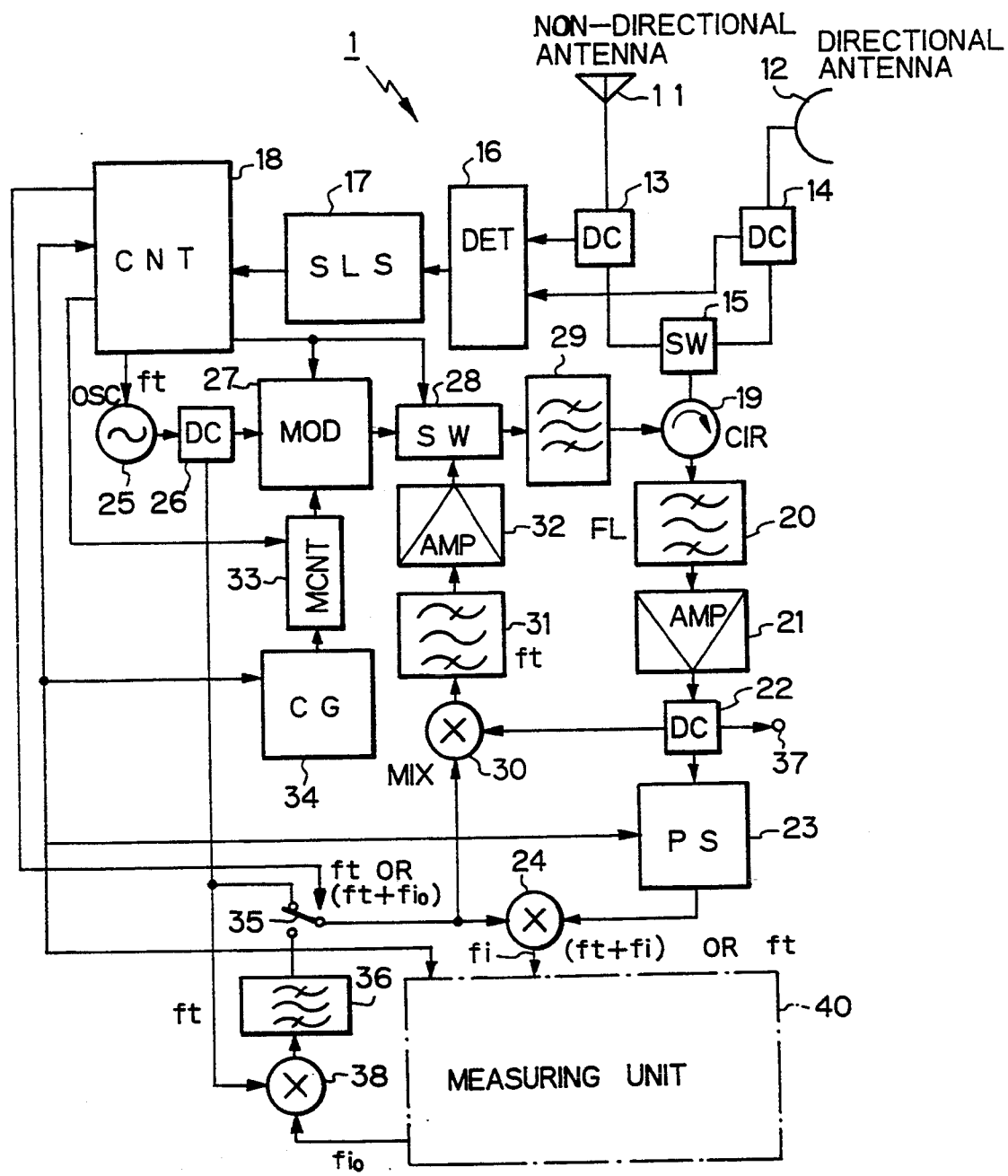
FIG. 4 is a block diagram of a transmission/reception unit of the fixed radio apparatus according to a first embodiment of the present invention.

FIG. 4 is a detailed block diagram of a transmission/reception unit of the fixed radio apparatus according to the first embodiment of the present invention. In FIG. 4, reference number 11 denotes a non-directional antenna; 12 a directional antenna; 13, 14, 22 and 26 directional couplers (DC); 15, 28 and 35 switches (SW); 16 a detection circuit (DC) for reception wave; 17 a side lobe suppression circuit (SLS); 18 a control circuit (CNT); 19 a circulator (CIR); 20, 29, 31 and 36 filters (FL); 21 and 32 amplifiers (AMP); 23 a phase shifter (PS); 24, 30 and 38 mixers (MIX); 25 a variable frequency oscillator (OSC) having high stabilized frequency; 27 a modulator (MOD); 33 a modulation control unit (MCNT) for controlling the modulator 27 in accordance with a CW (continuous wave) mode, a radar mode and a hopping mode; 34 a code generator (CG) for generating a Barker code and PN code; 37 a terminal connected to a spectrum analyzer for measuring reception intensity; and 40 a measuring unit.

In the first embodiment of the present invention, the fixed radio apparatus is fixedly provided only when measuring the propagation state of the radio wave, and it may be moved to an optional location if necessary.

The switches 15, 28 and 35 are controlled by the control circuit 18. The switch 15 connects between the circulator 19 and the directional coupler 13 or 14 so that it is possible to switch between the non-directional antenna 11 and the directional antenna 12.

When the transmission frequency is "ft" and the frequency returned from the mobile radio apparatus 2 is "fr", the switch 35 is switched as follows. That is, when measuring the signal of the returned frequency fr=(ft+fi) (here, "fi" is an intermediate frequency), the oscillator 25 generates the signal of the frequency ft and sends it to the mixer 24 through the directional coupler 26 and the switch 35. When measuring the reflected radio wave having the frequency ft, the oscillator 25 generates the frequency ft and sends it to the mixer 38 through the directional coupler 26, and the mixer 38 mixes the frequency ft with the frequency $fi_0$ and outputs the frequency $(ft+fi_0)$ to the mixer 24 through the filter 36.

Accordingly, the measuring unit 40 receives the intermediate frequency fi mixed by the mixer 24. In this embodiment, ft=3000 MHz, and fi=$fi_0$=10 MHz. The filter 20 has a pass-band of the frequency ft and fr=ft+fi, and the filters 29 and 31 have the passband of the frequency ft.

In FIG. 4, the radio wave returned from the mobile radio apparatus 2 is received by the non-directional antenna 11 and the directional antenna 12, and the reception signals divided by the directional couplers 13 and 14 are added to the detection circuit 16. The side lobe suppression circuit 17 compares the reception level of the non-directional antenna 11 and that of the directional antenna 12. In this case, the gain of the non-directional antenna 12 is set to a gain smaller than that of the main lobe of the directional antenna 12, and set to a gain larger than that of the side lobe.

Accordingly, when the reception level of the directional antenna 12 is smaller than that of the non-directional antenna 11, the suppression circuit 17 detects that the reception signal is based on the side lobe. On the contrary, when the reception level of the directional antenna 12 is larger than that of the non-directional antenna 11, the suppression circuit 17 detects that the reception signal is based on the main lobe of the directional antenna 12. Accordingly, it is possible to eliminate the influence of the side lobe of the directional antenna 12 and to precisely detect the direction of the mobile radio apparatus 2 based on the main lobe and the reception level of the non-directional antenna 11.

Figure 5:
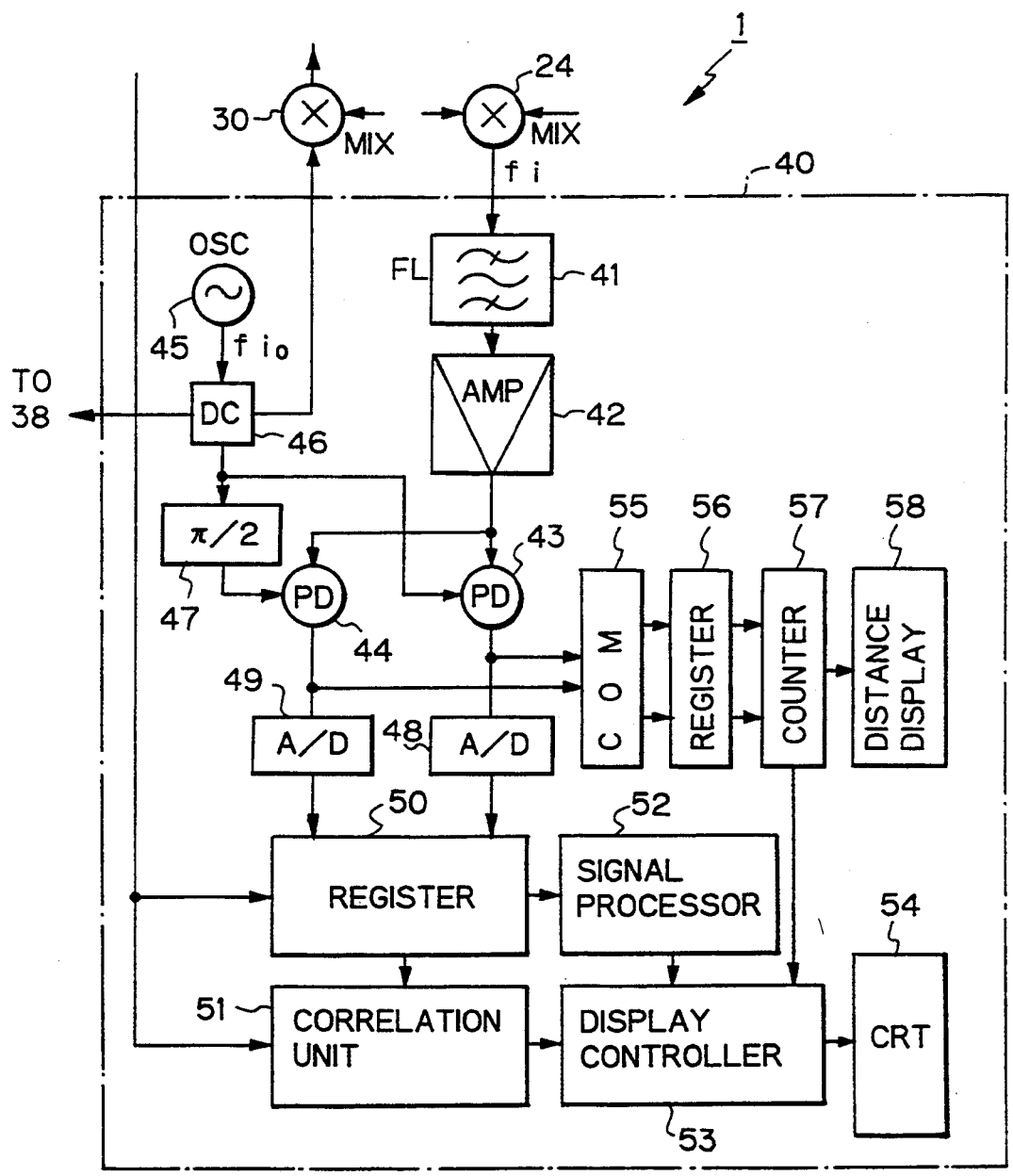
FIG. 5 is a block diagram of a measuring unit of the fixed radio apparatus according to the first embodiment of the present invention.

FIG. 5 is a block diagram of the measuring unit of the fixed radio apparatus according to the first embodiment of the present invention. In FIG. 5, reference number 41 denotes a filter (FL), 42 an amplifier (AMP), 43 and 44 phase detectors (PD), 45 an oscillator (OSC), 46 a directional coupler (DC), 47 a phase shifter (OSC) of 2, 48 and 49 square-composition circuits, 50 a register unit, 51 a correlation unit, 52 a signal processor, 53 a display controller, 54 a cathode-ray tube (CRT), 55 a comparator (COM), 56 a register, 57 a counter, and 58 a distance display unit.

The oscillator 45 generates the signal of the frequency $fi_0$ having a very highly stabilized phase. The frequency $fi_0$ is transmitted to the mixers 30 and 38 through the directional coupler 26, and transmitted to the phase detector 43 and 44 through the directional coupler 26. Further, the signal of the frequency fi from the mixer 24 is added to the phase detectors 43 and 44 through the amplifier 42. In the CW mode, the distance measured by the measuring means (comparator 55, register 56 and counter 57) is displayed on the distance display unit 58. In the radar hopping modes, the distance is measured by the square-composition units 48 and 49, register unit 50, the correlation unit 51, and the signal processor 52. The measured distance is displayed on the display unit 54 through the display control unit 53.

Figure 6:
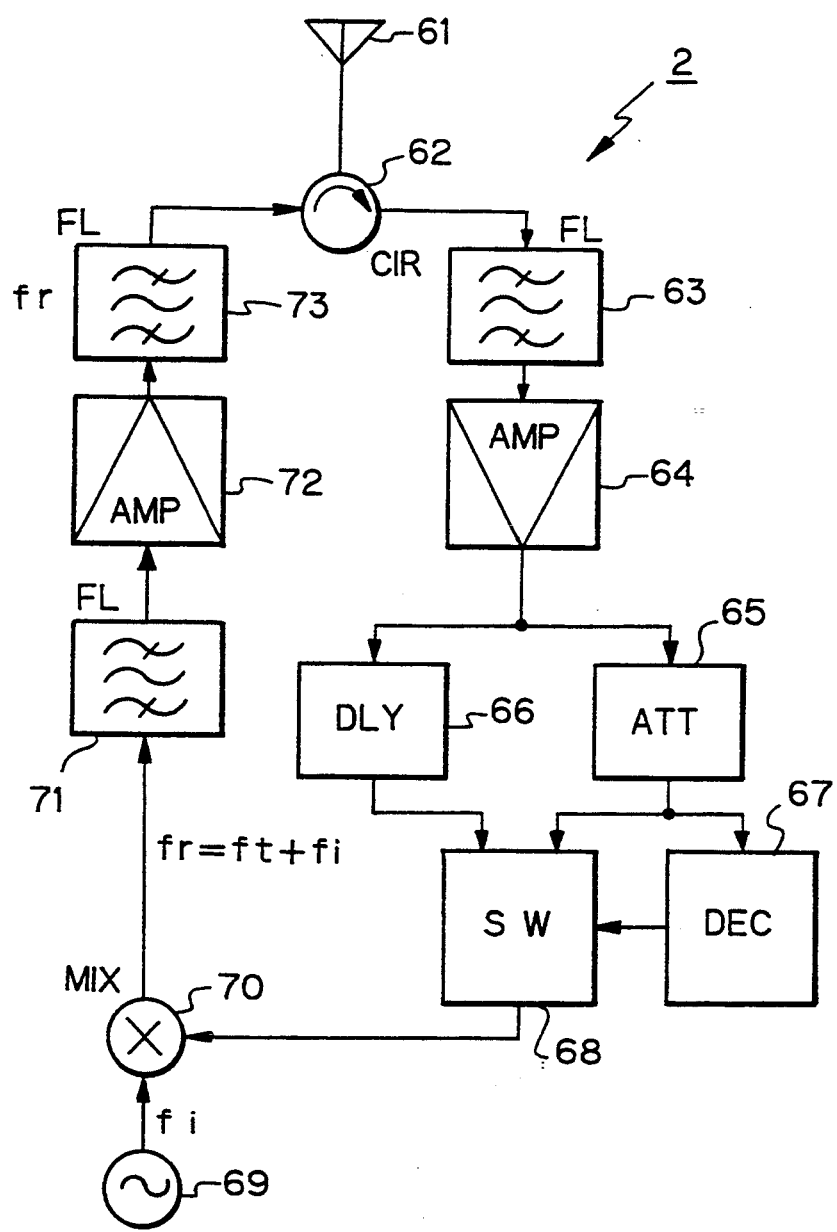
FIG. 6 is a block diagram of the mobile radio apparatus according to the first embodiment of the present invention.

FIG. 6 is a block diagram of a mobile radio apparatus according to a first embodiment of the present invention. In FIG. 6, reference number 61 denotes a non-directional antenna; 62 a circulator (CIR); 63, 71 and 73 filters (FL); 64 and 72 amplifiers (AMP) having a limiting function; 65 an attenuator (ATT); 66 a delay circuit (DLY); 67 a decoder (DEC); 68 a switch; 69 an oscillator; and 70 a mixer.

When the non-directional antenna 61 receives the signal of the frequency ft (=3000 MHz) from the fixed radio apparatus 1, the reception signal is transferred to the mixer 70 through the circulator 62, the filter 63, the amplifier 64, the attenuator 65, and the switch 68. The mixer 70 mixes the reception signal with the signal of the frequency fi (=10 MHz) generated by the oscillator 69. The mixer 70 generates the mixed signal fr=ft+fi (=3010 MHz) and sends it the antenna 61 through the filter 71r the amplifier 72, the filter 73 and the circulator 62. This mixed signal is called the returned signal. That is, the fixed radio apparatus 1 generates the radio wave of the frequency ft to the mobile radio apparatus 2, and the mobile radio apparatus returns the signal of the frequency fr (=ft+fi) to the fixed radio apparatus 1 as the returned signal to measure the propagation distance.

The decoder 67 decodes a control code from the fixed radio apparatus 1 to change the switch unit 68 so as to connect the delay circuit 66. Accordingly, a delayed signal is added to the mixer 70 through the switch 68. The delay circuit 66 is used to delay the returned signal to apparently lengthen the propagation distance between the fixed radio apparatus 1 and the mobile radio apparatus 2.

In the CW mode of FIG. 4, the frequency ft generated by the oscillator 25 is transmitted from the antennas 11 and 12 through the directional coupler 26, the modulator 27, the switch 28, the filter 29, the circulator 19 and the switch 15. As explained above, the returned signal of the frequency fr from the mobile radio apparatus 2 is received by the antennas 11 and 12, and transmitted to the lobe suppression circuit 17 through the detection circuit 16. The side lobe suppression circuit 17 compares the reception level of the non-directional antenna 11 with that of the directional antenna 12, and detects the direction of the incoming radio wave based on the direction of the main lobe when the reception level of the directional antenna 12 is larger than that of the non-directional antenna 11.

In the measuring unit 40, the output signal fi mixed by the mixer 24 is added to the phase detectors 43 and 44 through the filter 4[and the amplifier 42. The frequency fi is directly phase-detected by the frequency $fi_0$ in the phase detector 43, or phase-detected by the phase difference signal of $\pi/2$ in the phase detector 44. When two phase detectors 43 and 44 are provided as shown in the drawing, a phase blind state does not occur in the phase-detected output. However, if either one of phase detectors 43 or 44 is eliminated, a phase blind state occurs in the phase-detected output. In this case, it is possible to measure the propagation distance by utilizing this phase blind state even if only one phase detector is provided.

The measuring means, which does not utilize the phase blind state, is formed by two phase detectors 43 and 44, the square-composition circuits 48 and 49, register 50, and the signal processor 52. Since the phase detectors 43 and 44 perform phase detection based on a phase reference wave having phase difference of $\pi/2$, one output of the phase detection becomes $A \sin \theta$, the other becomes $A \cos \theta$ (where, $\theta$ denotes the phase difference between the reception wave and the phase reference signal). Each of square-composition circuits 48 and 49 converts the phase detection signal into a digital value, and the digital value is squared therein. The register 50 composes the above squared value so that the following formula, i.e., $A = (A \sin \theta)^2 + (A \cos \theta)^2$ is obtained. As is obvious from the above calculation, the signal A does not include the phase difference $\theta$.

The signal processor 52 performs the signal processing from the signal A on the frequency axis and calculates the propagation distance by utilizing the Fast Fourier Transformation (below, FFT). In FIG. 2, the propagation distance of the direct radio wave is shown by the "$R_0$" which indicates the distance between the fixed radio apparatus and the mobile radio apparatus. In this case, both-way travel of the radio wave is shown by $2 \times R_0$ as the minimum distance. Further, this distance $R_0$ denotes the maximum point of the correlation output of the direct radio wave. When the mobile radio apparatus is moving during measurement, the transmission wave becomes the output signal having a beat component of the Doppler frequency so that it is possible to raise the resolution of the distance by utilizing a filter bank in the FFT.

The other measuring means, which utilizes the phase blind state, is formed by the comparator 55, the register 56, and the counter 57. In this case, the transmission frequency from the oscillator 25 is swept from the frequency $f_1$ to the frequency $f_2$ to detect the change of the phase, and the counter 57 counts the number of times of the phase blind state.

Figure 7A:
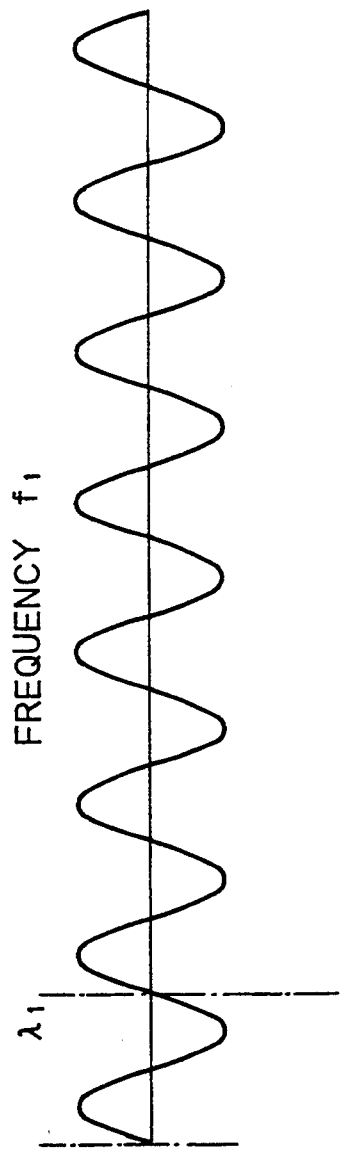
FIGS. 7A and 7B are explanatory views of the relationship between the wavelength and the frequency.
Figure 7B:
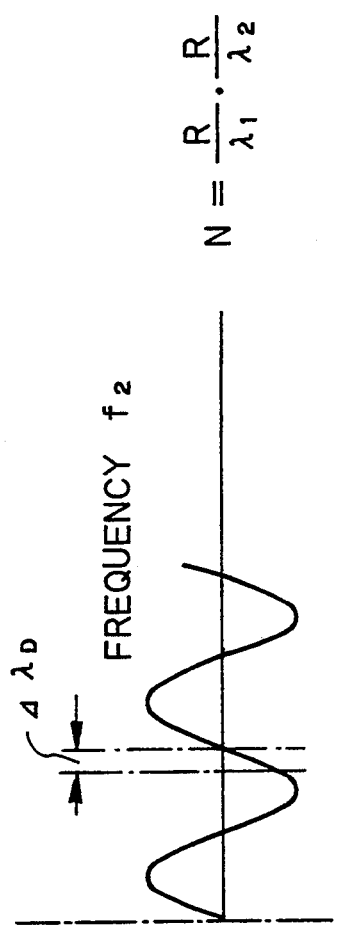

FIGS. 7A and 7B are explanatory views of relationship between a wavelength and frequency. FIG. 7A shows waveforms of the frequency $f_1$ (i.e., wavelength $\lambda_1$), and FIG. 7B shows the waveforms of the frequency $f_2$ (i.e., wavelength $\lambda_2$), where, "c" denotes light speed and $\Delta \lambda_D$ denote difference of the wavelength.

As is obvious, $f_1 = c/\lambda_1$, $f_2 = c/\lambda_2$, and $\lambda_2 = \lambda_1 + \Delta \lambda_D$. Further, since the number of waves can be denoted as $R/\lambda_1$ and $R/\lambda_2$ (R is propagation distance), the difference of the number of waves N can be denoted as follows.

$$N = (R/\lambda_1) - (R/\lambda_2) = (R/\lambda_1) - (R/\lambda_1 + \Delta \lambda_D)$$

In this case, the counter 57 counts the zero-cross points from the frequency $f_1$ to the frequency $f_2$ to obtain the difference of the number of waves N. Accordingly, since the wavelengths $\lambda_1$ and $\lambda_2$ are known, it is possible to obtain the propagation distance R from the above formula. Since the both-way travel of the radio wave is used for measurement of the propagation distance, it is possible to raise the measuring resolution of the propagation distance. The distance display unit 54 displays the averaged propagation distance after making the measurement several times.

It is possible to increase the number of times of the going/returning travel of the radio wave between the fixed radio apparatus and the mobile radio apparatus. That is, in FIG. 4, first, the oscillator 25 generates the frequency ft to the mobile radio apparatus through and the antenna 11. After this transmission, the switch 28 is changed to the amplifier 32. Further, one of the signals branched by the directional coupler 22 is sent to a spectrum analyzer (not shown) through the terminal 37. The other signal from the directional coupler 22 is sent to the mixer 30.

In the mixer 30, as shown in FIG. 5, the output of the directional coupler 22 is mixed with the output of the directional coupler 26 which is the transmission signal ft from the generator 25. The transmission signal ft is transmitted to the mobile radio apparatus 2 through the filter 31, the amplifier 32, the switch 28, the filter 29, the circulator 19, the switch 15, the directional coupler 13 and the non-directional amplifier 11 (or the directional coupler 14 and the directional amplifier 12).

Since the mobile radio apparatus 2 receives the signal of the frequency ft and returns the signal of the frequency fr to the fixed radio apparatus 1, the transmission/reception of the radio wave is performed between the fixed radio apparatus and the mobile radio apparatus until the switch 28 is switched to the modulator 27. Accordingly, it is possible to obtain the precise result of the measurement in the measuring unit 40 since it is performed after several times of transmission/reception.

Further, the delay time of the delay circuit 66 is previously determined in the mobile radio apparatus 2. Accordingly, when the control code from the modulation control unit 33 is modulated by the modulator 27 and the modulated signal is transmitted from the fixed radio apparatus 1, the modulated signal is decoded by the decoder 67 to distinguish the control code and to switch the switch unit 68 so that the signal delayed by the delay circuit 66 is returned to the fixed radio apparatus 1. Accordingly, it is possible to obtain apparently elongated propagation time of the radio wave so that it is possible to precisely measure the so that it is possible to precisely measure the propagation distance of the radio wave. Particularly, when the distance between the fixed radio apparatus and the mobile radio apparatus is very short, the measurement according to the present invention is very effective because the influence of the reflected wave can easily be eliminated in the measurement.

In the radar mode, the code generation unit 34 of FIG. 4 generates the code having relatively larger autocorrelation, for example, the PN code, and this code is input to the modulation unit 33. The modulation unit 33 controls the modulation unit 27 to perform phase modulation of an output signal of the oscillator 25. A modulated signal is transmitted from the non-directional antenna 11. The mobile radio apparatus 2 returns a signal having the converted frequency to the fixed radio apparatus 1 regardless of the mode. Accordingly, the signal returned from the mobile radio apparatus 2 is received by the non-directional antenna 11 and the directional antenna 12 of the fixed radio apparatus 1, and the side lobe suppression unit 17 controls the directional antenna 12 so as to receive the main lobe so that it is possible to distinguish the direction of the incoming radio wave. The phase shifter 23 shifts the reception signal, performs the demodulation of the PN code and adds the PN code to the measuring unit 40 through the mixer 24.

Figure 8:
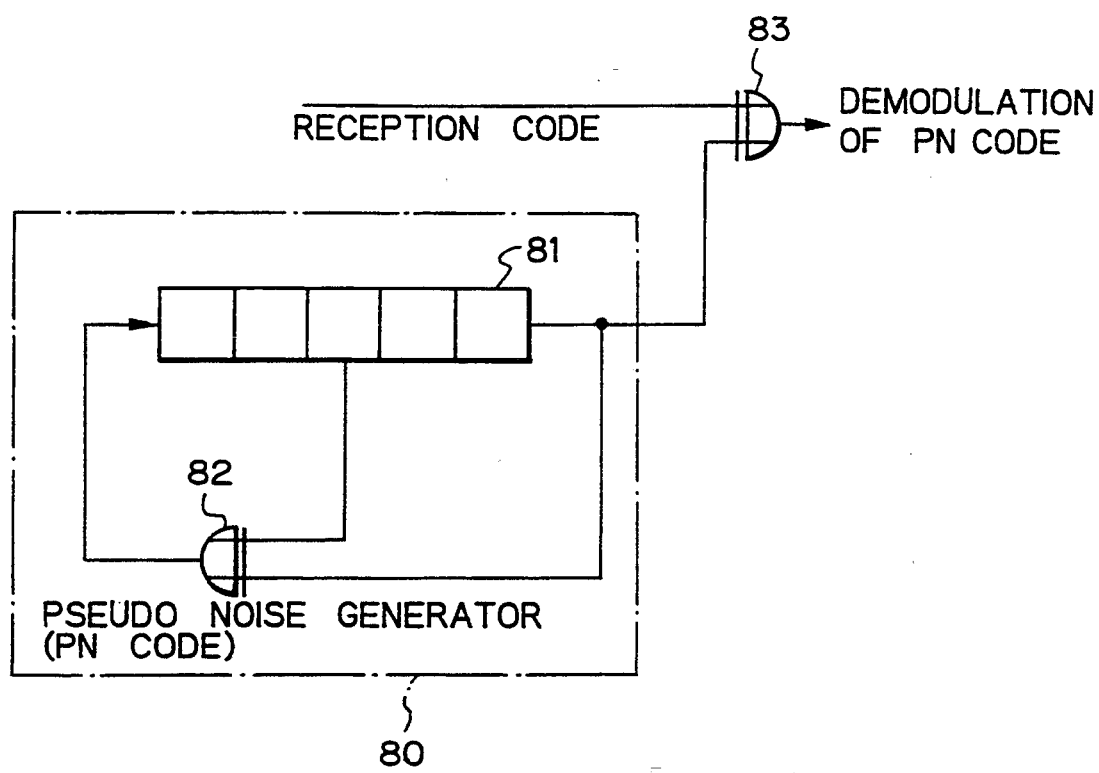
FIG. 8 is an essential block diagram of a demodulation circuit for a signal extracting operation according to the first embodiment of the present invention.

FIG. 8 is a block diagram of the essential part of a demodulation circuit for a signal extracting operation according to the first embodiment of the present invention. The signal extraction circuit is formed by a pseudo noise generator 80 and an exclusive OR gate 83, and generates the PN code from the exclusive OR gate 83. The pseudo noise generator 80 is formed by a five-bit shift register 81 and an exclusive OR gate 82. As shown in the drawing, an intermediate stage and an output stage of the shift register 81 are input to the exclusive OR gate 82, and an output of the exclusive OR gate 82 is input to the shift register 81. According to this structure, it is possible to obtain the PN code having 31 bits per one period. This PN code is called an "M" code. This circuit is provided in the code generation unit 34 in FIG. 4.

Since a reception code is set into the register 50, the pseudo noise generator 80 is started in the transmission timing so that the reception code in the register 50 and an output of the pseudo noise generator 80 are input to the exclusive OR gate 83. Accordingly, it is possible to obtain a time indicating the maximum correlation based on the change of the number of shift operation or the number of shift clock so that it is possible to obtain the propagation time, i.e., the propagation distance of the radio wave.

The signal extraction circuit shown in FIG. 8 may be provided in the correlation unit 51 in FIG. 5, and the pseudo noise generation unit 80 may be provided in the code generation unit 34 in FIG. 4. Further, although the PN code is formed by five bits in this embodiment, it is possible to use more bits as the above code. Still further, it is possible to utilize the Barker code which is used for the coded phase modulation of the pulse compression radar.

Figure 9:
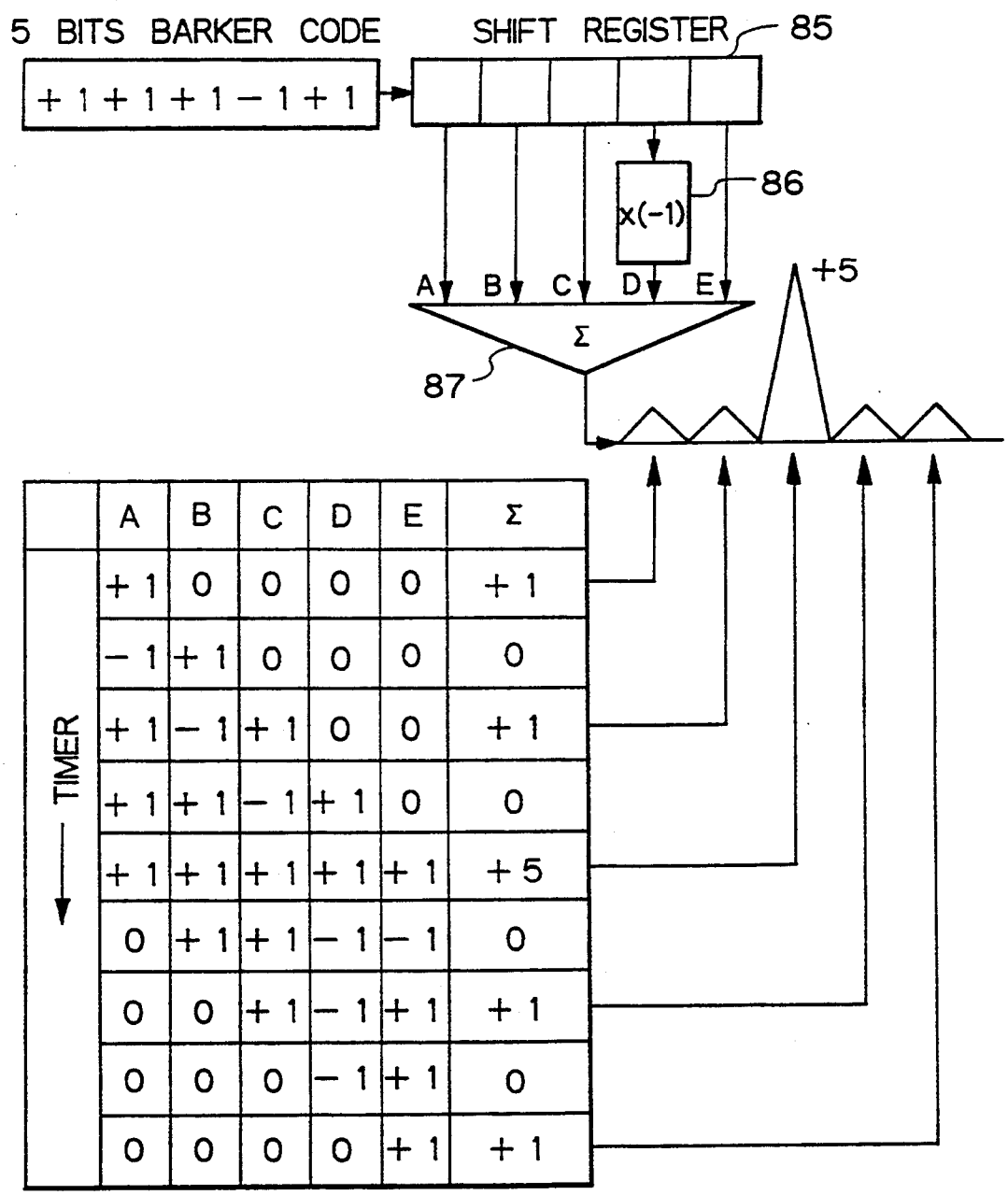
FIG. 9 is a view for explaining a demodulating operation for the Barker code used in the demodulation circuit shown in FIG. 8.

FIG. 9 is a view for explaining demodulating operation for the Barker code used in the demodulation circuit shown in FIG. 8. This figure is for the case where the Barker code has five bits (below, five-bit Barker code). The five-bit Barker code which is set in the register 50 is input to the shift register 85. Each step of the shift register 85 is input to the adder 87 to add each step. Further, invertor 86 is provided between the shift register 85 and the adder 87.

The five-bit Barker code is formed by "+1, −1, +1, +1, +1", and reference letters A to E denote each output of the shift register 85. Each output A to E changes in accordance with the time elapsed. Reference $\pi$ denotes an output of the adder 87 obtained by summing each output A to E in the adder 87. For example, when the output A is "+1", and B to E are "0", the output Σ becomes "+1". When the output A is "−1", B is "+1" and C to E are "0", the output Σ becomes "0". Further, when the outputs A to E are "+1" (the output D becomes "+1" after inversion from "−1"), the output Σ becomes "+5". Since the output Σ (i.e., auto-correlation) becomes maximum at this timing, it is possible to extract the Barker code formed by five bits. Accordingly, it is possible to obtain the propagation distance, i.e., propagation time by measuring the time extracting the Barker code in use of the shift clock. As explained above, the signal extraction circuit is provided as the correlation unit 51 in the measuring unit 40. Further, the code generation unit 34 has the structure for generating the barker code having five bits.

Further, in use of several kinds of PN codes or Barker codes, the fixed radio apparatus transmits one kind of code having a predetermined period, and further transmits another kind of code having a predetermined period and these steps are repeated. Further, the fixed radio apparatus transmits the code by changing the predetermined period so that it is possible to measure the propagation distance.

In the case of the hopping mode, the oscillator 25 is controlled by the control circuit 18 to perform the frequency-hopping operation in the oscillator 25. If the oscillator 25 is formed by a frequency synthesizer, it is possible to perform highly stabilized frequency hopping operation. Further, in the hopping mode, since it is possible to randomize the bit-errors in the selective fading, it is possible to raise the reliability of the measurement of the propagation distance by averaging the errors in use of the code having large auto-correlation. Further, it is possible to provide a set of different kinds of code and the frequency-hopping.

Figure 10:
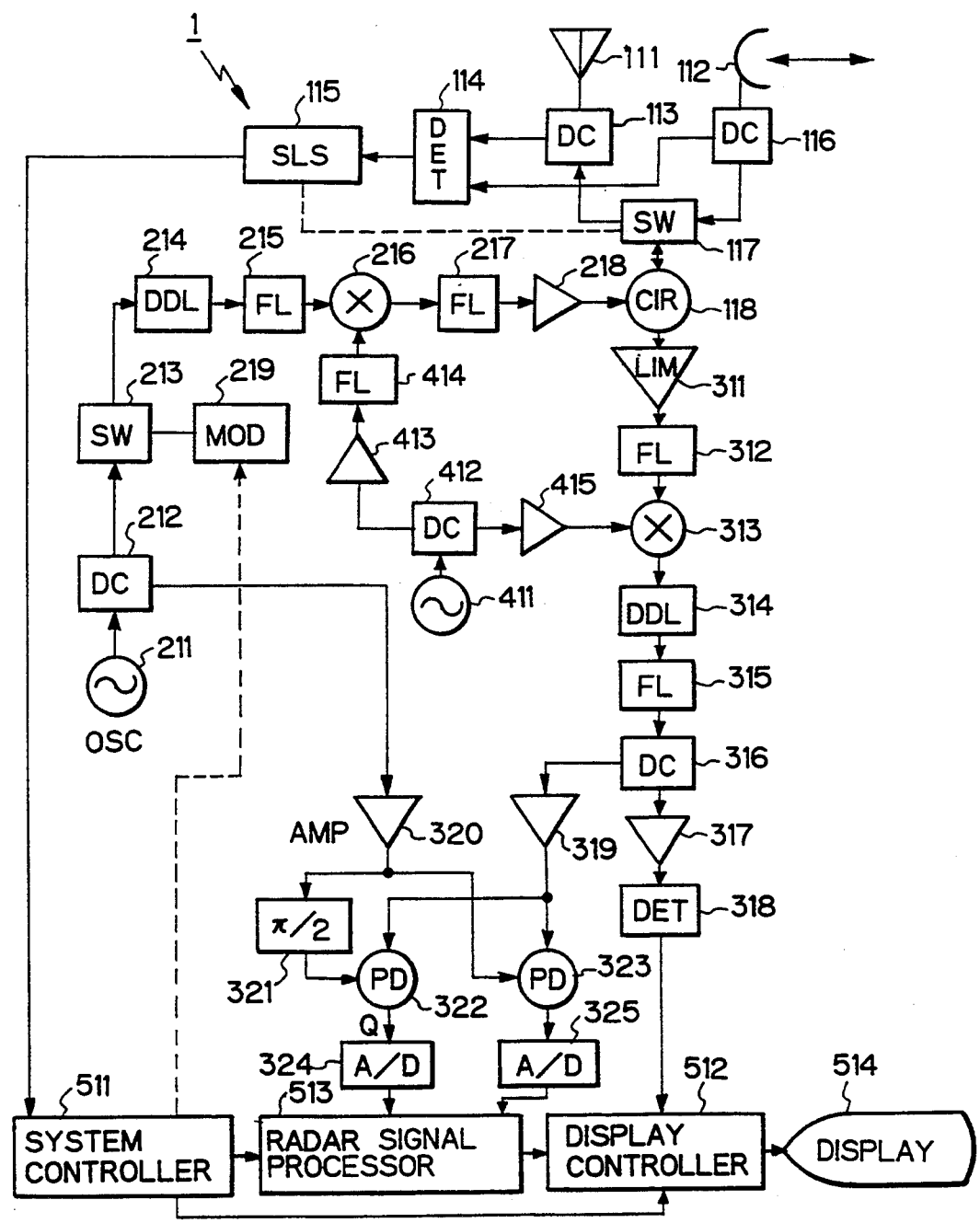
FIG. 10 is a block diagram of the fixed radio apparatus according to a second embodiment of the present invention.

FIG. 10 is a block diagram of the fixed radio apparatus according to a second embodiment of the present invention. In the drawing, DC denotes a directional coupler, DET denotes a detector, SLS denotes a side lobe suppression unit, SW denotes a switch, CIR denotes a circulator, FL denotes a filter, PD denotes a phase detector, DD1 denotes a dispersive delay line, and LIM denotes a limit amplifier.

As the structural feature of the second embodiment, the following elements are added to the first embodiment. That is, in the fixed radio apparatus 1, the transmission unit has the dispersive delay line DDL 214 and the RF pulse oscillator 211 performing the linear frequency modulation, and the reception unit has the limit amplifier LIM 311 and the dispersive delay line DDL 314. Further, the mobile radio apparatus has the limit amplifier LIM 615.

Briefly, the second embodiment is operated as follows. The fixed radio apparatus 1 radiates a radio wave similar to a radar system. The frequency conversion is performed by the RF pulse which is processed by the linear frequency modulation, and by the frequency of the local oscillator 411 to obtain the spectrum-spread and the enlarged RF pulse signal. This signal is transmitted to the mobile radio apparatus 2.

In the mobile radio apparatus 2, a spectrum inverted signal, which is obtained by the frequency converter 617 based on a signal from the oscillator 618, is selected by the filter 619. Further, this spectrum inverted signal is returned to the fixed radio apparatus. In the fixed radio apparatus 1, the frequency conversion for the returned signal is performed by using the same local oscillator as the oscillator 618 of the mobile radio apparatus 2.

Further, although details are explained in FIGS. 12A to 12H, in the fixed radio apparatus 1, the reception signal (in this case, a reception wave is an inverted linear frequency modulation wave) is suppressed by the function of the pulse compression radar using the dispersive delay line DDL. Further, the energy of the reflected wave, which is spread in accordance with the time and the frequency, is concentrated. As a result, it is possible to measure the propagation characteristic for every delay time from the radiation timing from the fixed radio apparatus 1.

In the second embodiment of the present invention, as is obvious from the comparison of FIG. 4 with FIG. 10, the reception signal by the non-directional antenna 111 and the directional antenna 112 are transmitted to the side lobe suppression unit 115 through the directional couplers 113, 116 and the detector 114. Further, the side lobe suppression unit 115 detects the direction of the radio wave in the same method as the first embodiment. After detection of the radio wave, the output of the side lobe suppression unit 115 is sent to the radar signal processor 513 through the system controller 511 to perform the pulse suppression based on the radar technique. Accordingly, the energy of the radio wave is spread in accordance with the time and the frequency so that it is possible to suppress the interference wave and to perform the precise measurement of the propagation distance.

Further, by suppressing the interference wave, the bandwidth of the propagation frequency is broadened as in the spectrum spreading communication, and the spectrum is also broadened so that the propagation time is elongated to reduce the influence on the signal propagating for a long time. In the case of strong interference, the interference wave is suppressed (i.e., amplitude-limited) by the limit amplifier to suppress the energy of the interference. The radio wave is re-transmitted from the mobile radio apparatus 2, and the influence of the strong interference is suppressed by the limit amplifier in the fixed radio apparatus 1. The dispersive delay line DDL concentrates the energy of the signal as to the time and frequency and obtains the line-like spectrum. Further, a relatively concentrated interference wave is spread by the dispersive delay line so as to reduce the influence of the interference. Accordingly, it is possible to improve the resolution for the time and frequency of the reception signal.

In the second embodiment, as in the radar apparatus, the time and phase of the frequency and the modulation code of the radiated wave are precisely known. The resolution for the distance, as in the radar apparatus, becomes 150 m/sec (the same as half the speed of light) since the propagation distance is for both-way travel. Accordingly, it is possible to raise the resolution of the distance compared with the one-way distance.

Further, by employing the pulse compression radar, in accordance with this method, the signal on the propagation appears to have a long transmission pulse and is spread on the frequency axis. After reception, the reception pulse is suppressed to the narrow pulse width of approximately 1/10 of the transmission pulse width to measure the distance.

That is, in accordance with the pulse compression radar, the propagation energy of the transmission wave is spread for the time and frequency in the predetermined frequency range when radiating the radio wave. The normal interference wave is an almost line-like spectrum in which the energy is concentrated on the frequency axis. In the present invention, after the reception of the interference wave, this wave is amplitude-limited by the limit amplifier so as to reduce the unnecessary strong energy of the radio wave. After reducing the interference wave, the reception wave is inverted to the intermediate frequency. As a result, the reception energy which is spread by the dispersive delay line is concentrated, while on the contrary, the interference wave having the line-like spectrum is spread.

In the fixed radio apparatus, the antenna system is formed by the non-directional antenna 111, the directional antenna 112, the directional couplers 113 and 116, the reception detector 114, the side lobe suppression unit 115, the switch 117, and the circulator 118.

Further, the transmission system of the fixed radio apparatus is formed by the high stabilized oscillator 211, the directional coupler 212, the pulse switch 213, the dispersive delay line 214, the filter 21, the mixer 216, the filter 217, the amplifier 218, and the modulator 219. In the second embodiment, although the dispersive delay line DDL 214 is provided in the fixed radio apparatus 1, it is possible to obtain the same effect as the above by using the pulsed RF oscillator 211, which can generate the FM chirp pulse signal having the equivalent output signal of the dispersive delay line DDL, without use of the switch 213 and the dispersive delay line DDL 214.

Still further, the reception system of the fixed radio apparatus 1 is formed by the limit amplifier 311, the filter 312, the mixer 313, the dispersive delay line 314, the filter 315, the directional coupler 316, the amplifier 317, the phase detectors 322 and 323, and the A/D convertors 324 and 325. The feature of the structure is to provide the limit amplifier 311 and the dispersive delay line 314.

Still further, the local oscillation system is formed by the local oscillator 411, the directional coupler 412, the amplifiers 413 and 415, and the filter 414. The signal processor 513 is formed by a known radar signal processor. The display system is formed by the control unit 511, the display control unit 512, and the display apparatus 514.

Figure 11:
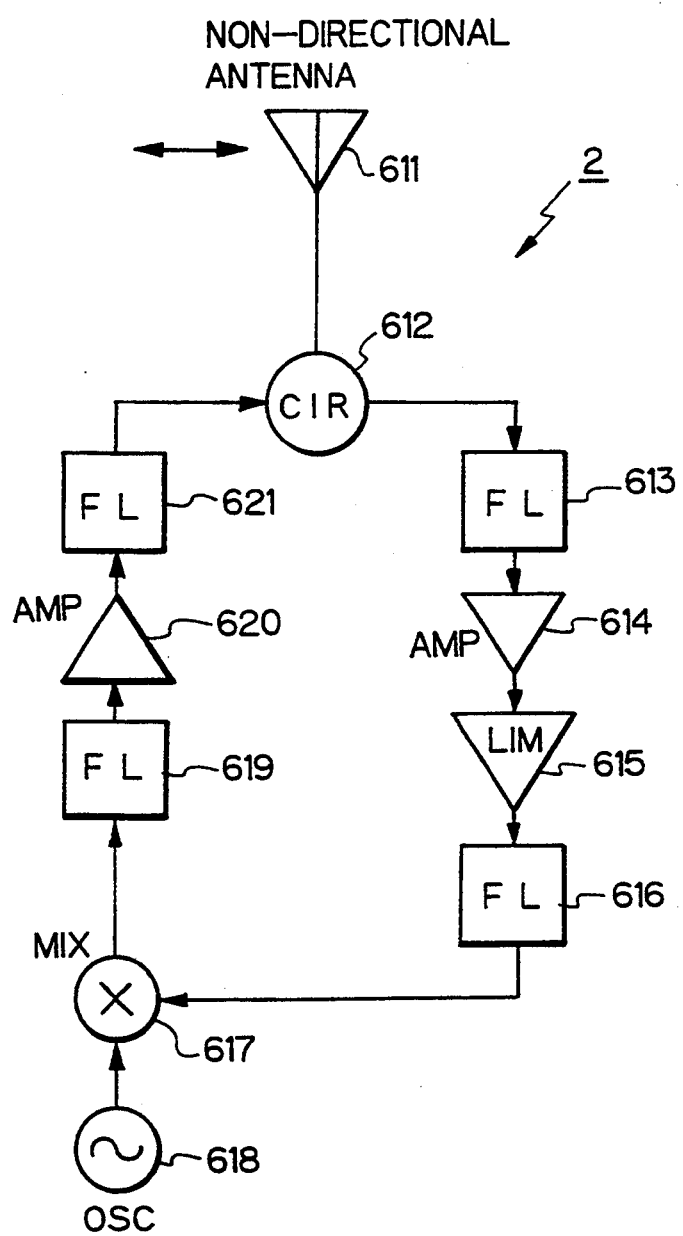
FIG. 11 is a block diagram of the mobile radio apparatus according to the second embodiment of the present invention.

In the mobile radio apparatus shown in FIG. 11, the mobile radio apparatus 2 is formed by a filter (FL) 613, an amplifier (AMP) 614, a limit amplifier (LIM) 615, and a filter 616 as the reception side. Further, the mobile radio apparatus is formed by a mixer (MIX) 617, a filter 619, an amplifier 620, a filter 621, and a circulator (CIR) 612 as the transmission side. The feature of the structure is to provide the limit amplifier 615.

As explained above, the fixed radio apparatus 1 has the non-directional antenna 111 and the directional antenna 112, and the side lobe suppression unit 115 suppresses the side lobe to detect a real direction of the radio waves. That is, when the intensity of the radio wave from the non-directional antenna 111 is stronger than that of the directional antenna 112, the side lobe suppression unit 115 decides that the directional antenna 112 receives the side lobe. Contrary, when the intensity of the radio wave from the directional antenna 111 is stronger than that of the non-directional antenna 112, the side lobe suppression unit 115 decides that the directional antenna 112 receives the main lobe. Accordingly, it is possible to prevent an error caused by the reflected wave when measuring the direction based on the main lobe (i.e., main beam) of the directional antenna 112.

FIGS. 12A to 12B are explanatory views of waveforms of a pulse compression radar using the linear frequency modulation described in the second embodiment.

In FIG. 12A, the transmission signal from the oscillator 211 (for example, a frequency synthesizer) is changed to a pulse signal by the pulse switch 213.

In FIG. 12B, since a high frequency pulse becomes broad as the spectrum in the vicinity of the carrier frequency, it is possible to have a spectrum spread with a nearly flat amplitude in the necessary frequency range.

In FIG. 12C, the dispersive delay line DDL 214 has a characteristic as shown by the graph. The amount of delay of the input spectrum is gradually increased in accordance with the increment of the frequency. Accordingly, the higher the frequency, the larger the amount of delay.

In FIG. 12D, the frequency of the output of the dispersive delay line 214 is increased in accordance with the time elapsed. The output of the dispersive delay line 214 is filtered by the filter 215 to concentrate at the predetermined frequency range. The output of the filter 215 mixed with the output of the filter 414 is raised to the carrier frequency (see, FIG. 12G-1) by the mixer 216 (up-converter). Where $+f_0$ is the carrier frequency and fL is the center frequency of the local oscillator 411. The mixed signal $(+f_0)$ is transmitted to the mobile radio apparatus 2 through the filter 217, the circulator 118, the switch 117, and the antenna 111 or 112 (see, FIG. 12G-2).

In FIG. 12E, to obtain the opposite frequency characteristic from that of FIG. 12D, the mobile radio apparatus receives the frequency $f_0$ and shifts the frequency to the opposite side (fL +f0) of the center frequency fL as shown in FIG. 12G-2. Further, the frequency (fL +f0) is shifted to the frequency (fL - f0) by the local oscillator 618 (shift local oscillator) as shown in FIG. 12G-3.

In the fixed radio apparatus 1, the reception signal is transmitted to the mixer 313 (down-convertor) through the limit amplifier 311 and the filter 312, and the mixer 313 mixes the reception signal with the local frequency fL from the oscillator 411 to drop the frequency to the original base-band as shown in FIG. 12G-4.

As is obvious from FIG. 12G-4, the signal returned to the original frequency f0 (see, FIG. 12G-4) is similar to the frequency inverted from FIG. 12G-1, and the waveform of this signal is shown by FIG. 12E.

The signal shown in FIG. 12E from the mixer 313 is transmitted to the dispersive delay line 314 having the characteristic shown in FIG. 12F. As a result, the output of the dispersive delay line 314 becomes as shown by FIG. 12H.

As shown in FIG. 12H, the pulse width "T" in FIG. 12E is suppressed to the width "1/Δf", and the amplitude is expressed by $$\sqrt{T \cdot \Delta f}$$.

In FIG. 12H, the ordinate is the amplitude and the abscissa is the time. The detection unit 318 in FIG. 10 detects the amplitude of the reception signal to obtain the reception timing so that it is possible to obtain the propagation time of the going/returning path of the ratio wave. That is, it is possible to obtain the distance to the reflection point and to clarify the propagation path.

As explained above, the radio wave radiated from the fixed radio apparatus 1 is transmitted to the mobile radio apparatus 2 which has the frequency converter and amplifier not saturating under the predetermined measurement conditions. In the mobile radio apparatus 2, the reception wave is amplified, and unnecessary amplitude is limited by the limit amplifier 615. The reception signal is mixed with the frequency from the oscillator 618 in the mixer 617. The frequency of the mixed signal is shifted to the opposite side for the frequency of the local oscillator 618. Further, the reception signal shifted to the opposite side is retransmitted to the fixed radio apparatus 1 as shown in FIG. 12G-3.

In the fixed radio apparatus 1, the reception signal is input to the amplifier 319 through the directional coupler 316, and further input to the phase detectors 322 and 323 through the amplifier 319. Further, the output of the oscillator 211 is input to the amplifier 320 through the directional coupler 212. The output of the amplifier 320 is directly input to the phase detector 323, and input to the phase detector 322 through the phase shifter 321 which obtains the phase different of $\pi/2$ (i.e., 90 degrees) from the reception signal. This phase shifter 312 is provided to eliminate the phase-blind state in the phase detector 322. In this case, the phase-blind state is expressed by the formula $(\theta_a - \theta_b = 0)$.

The phase detector 322 outputs a signal "Q" which is obtained by mixing the output of the amplifier 319 with the output of the phase shifter 321. That is, "Q" is expressed by (A B cos $(\theta_1 - \theta_b)$).

The phase detector 323 outputs a signal "I" which is obtained by mixing the output of the amplifier 319 with the output of the amplifier 320. That is, "I" is expressed by (A B sin $(\theta_2 - \theta_b)$).

The above signals Q and I are converted to digital signals by the corresponding A/D convertors 324 and 325, and input to the radar signal processing unit 513.

In the radar signal processing unit 513, the signals Q and I are squared by a high speed multiplier circuit (not shown). The multiplier circuit obtains the composition signal (A B)$^2$ as the power signal regardless of the phase $(\theta_2, \theta_b)$. This composition signal is processed by Fast Fourier Transformation FFT (not shown) to perform the converting process regarding the frequency axis. That is, this converting process is performed for the non-phase blind signal after processing for power spectrum in the filter bank of the FFT. The Doppler frequency can be also processed by the FFT when the mobile radio apparatus is moving.

Briefly, the second embodiment, the spectrum of the radio wave is spread in propagation of the radio waves to reduce the propagation energy per unit area so that the radio wave is not amplitude-limited by the limit amplifier. Further, the interference wave has a linelike spectrum after concentration on the frequency axis. Accordingly, this interference affects the amplitude limitation from the limit amplifier. Accordingly, it is possible to obtain precise measurement of the propagation state of the radio wave in the radio environment.

I claim:

1. A radio wave environment measuring system for measuring propagation state of radio waves, comprising:

a fixed radio apparatus provided in a base station; and
a mobile radio apparatus in communication with the fixed radio apparatus through the radio waves,
the mobile radio apparatus having a transmission/reception means for receiving a transmission signal from the fixed radio apparatus and for sending a return signal to the fixed radio apparatus, and
the fixed radio apparatus having a transmission/reception means for sending the transmission signal to the mobile radio apparatus and for receiving the returned signal from the mobile radio apparatus, and a measuring means for determining the propagation state of radio wave, wherein the propagation state of the radio waves includes at least one of a propagation distance, direction and reception intensity of the radio waves between the fixed radio apparatus and the mobile radio apparatus based on the transmission signal and the returned signal.

2. A radio wave environment measuring system as claimed in claim 1, wherein the transmission/reception means of the fixed radio apparatus comprises a repeater means for receiving the returned signal and again sending the returned signal to the mobile radio apparatus, and the transmission/reception means of the mobile radio apparatus also comprises a repeater means for sending the returned signal to the fixed radio apparatus, and wherein one of the transmission and the reception of the transmission and returned signals are performed for predetermined times between the fixed radio apparatus and the mobile radio apparatus.

3. A radio wave environment measuring system as claimed in claim 2, wherein the measuring means determines the propagation state of the radio waves based on the first transmission signal and the returned signal after one of the transmission and the reception for predetermined times.

4. A radio wave environment measuring system as claimed in claim 1, wherein the fixed radio apparatus further comprises a non-directional antenna and a directional antenna.

5. A radio wave environment measuring system as claimed in claim 1, wherein the transmission/reception means of the fixed radio apparatus further comprises a side lobe compression means for deciding a reception signal based on a main lobe when the reception intensity of the directional antenna is larger than that of the non-directional antenna.

6. A radio wave environment measuring system as claimed in claim 1, wherein the transmission/reception means of the fixed radio apparatus further comprises a sweep means for switching the frequency of the transmission signal and sweeping the frequency, and wherein the measuring means measures the propagation state of the radio waves based on change of the phase difference between the transmission signal and the returned signal.

7. A radio wave environment measuring system as claimed in claim 1, wherein the transmission/reception means of the fixed radio apparatus further comprises a transmission means for sending a transmission signal modulated by codes having large autocorrelation, correlation, and wherein the measuring means measures the propagation state based on the auto-correlation for the demodulated codes which are obtained by the returned signal from the mobile radio apparatus.

8. A radio wave environment measuring system as claimed in claim 1, wherein the transmission/reception means of the mobile radio apparatus further comprises a delay circuit for delaying the returned signal based on an instruction from the fixed radio apparatus.

9. A radio wave environment measuring system as claimed in claim 1, wherein the measuring means of the fixed radio apparatus further comprises a square-composition means for obtaining the phase difference between the returned signal and a reference carrier having a 90 degree phase difference, and squaring the phase difference signal to obtain a composition signal.

10. A radio wave environment measuring system as claimed in claim 1, wherein the transmission/reception means of the fixed radio apparatus further comprises a dispersive delay line DDL and a pulse oscillator for generating linear frequency modulated pulses in the transmission means, and a limit amplifier LIM and a dispersive delay line for demodulating in the reception means, and wherein the mobile radio apparatus further comprises a frequency converter and a limit amplifier.

11. A radio wave environment measuring system as claimed in claim 10, wherein:
   the fixed radio apparatus generates a transmission signal similar to a radar radio wave from the pulse oscillator, performs linear frequency modulation to obtain a spectrum-spread pulse for a time axis based on the dispersive delay line, and sends the spectrum-spread pulse to the mobile radio apparatus;
   the mobile radio apparatus performs spectrum inversion based on the frequency-converted reception signal, and sends the returned signal to the fixed radio apparatus;
   the fixed radio apparatus performs frequency conversion to obtain a linear-frequency modulated pulse having an opposite characteristic to the transmission signal, suppresses the modulated pulse based on the function of the pulse compression radar to concentrate the reflection energy spread for the time and frequency, and measures the propagation state of radio waves for every delay time from the start of the transmission of the radio waves by the fixed radio apparatus.

12. A radio wave environment measuring system as claimed in claim 10, wherein each of the limit amplifiers in the fixed and mobile radio apparatuses has the function for suppressing the amplitude of an interference wave, and the above amplitude-limited interference waves are spread by the pulse compression function for the time and frequency.

* * * * *